United States Patent
Li et al.

(10) Patent No.: US 9,584,272 B2
(45) Date of Patent: Feb. 28, 2017

(54) METHODS AND RADIO NETWORK NODES FOR MEASURING INTERFERENCE

(71) Applicants: Shaohua Li, Beijing (CN); Zhiheng Guo, Beijing (CN); Jinhua Liu, Beijing (CN); Xinghua Song, Beijing (CN); Zhan Zhang, Beijing (CN)

(72) Inventors: Shaohua Li, Beijing (CN); Zhiheng Guo, Beijing (CN); Jinhua Liu, Beijing (CN); Xinghua Song, Beijing (CN); Zhan Zhang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 533 days.

(21) Appl. No.: 13/817,665

(22) PCT Filed: Nov. 26, 2012

(86) PCT No.: PCT/CN2012/085238
§ 371 (c)(1),
(2) Date: Feb. 19, 2013

(87) PCT Pub. No.: WO2014/079052
PCT Pub. Date: May 30, 2014

(65) Prior Publication Data
US 2014/0219113 A1    Aug. 7, 2014

(51) Int. Cl.
*H04L 5/00* (2006.01)
*H04W 24/08* (2009.01)
(Continued)

(52) U.S. Cl.
CPC ......... *H04L 5/0032* (2013.01); *H04B 17/345* (2015.01); *H04W 24/08* (2013.01);
(Continued)

(58) Field of Classification Search
CPC .... H04L 5/0032; H04W 24/08; H04W 52/04; H04W 72/0446; H04W 72/1263
(Continued)

(56) References Cited

U.S. PATENT DOCUMENTS

| 2004/0127259 A1* | 7/2004 | Matsunaga ................... 455/560 |
| 2008/0144522 A1* | 6/2008 | Chang et al. ................. 370/252 |

(Continued)

FOREIGN PATENT DOCUMENTS

| CN | 101877865 A | * 11/2010 | .......... H04W 36/385 |
| CN | 102217361 A | * 10/2011 | ............ H04W 24/08 |

(Continued)

OTHER PUBLICATIONS

ETSI, "LTE; Evolved Universal Terrestrial Radio Access (E-UTRA); Physical channels and modulation", Apr. 2011, ESTI, 3GPP TS 36.211 version 10.1.0 Release 10, pp. 10-11.*
(Continued)

*Primary Examiner* — Un C Cho
*Assistant Examiner* — Shah Rahman
(74) *Attorney, Agent, or Firm* — Coats & Bennett, PLLC

(57) ABSTRACT

A first radio network node (110) and a method therein for measuring interference as well as a second radio network node (120) and a method therein for enabling the first radio network node to measure interference are disclosed. The first radio network node (110) obtains (201) configuration information for indicating a designated subframe in which a reference signal for measurement of the interference is to be transmitted by the second radio network node (120). The second radio network node (120) obtains (202) configuration information for configuring a designed subframe for transmission of a reference signal. The first radio network node (110) receives (205), in the designated subframe indicated by the configuration information, the reference signal trans-
(Continued)

mitted by the second radio network node (120). The first radio network node (110) determines (206) a value of the interference based on the reference signal.

34 Claims, 6 Drawing Sheets

(51) Int. Cl.
*H04W 52/24* (2009.01)
*H04B 17/345* (2015.01)
*H04W 72/04* (2009.01)
*H04W 52/14* (2009.01)

(52) U.S. Cl.
CPC ........ *H04W 52/241* (2013.01); *H04W 52/143* (2013.01); *H04W 72/0446* (2013.01)

(58) Field of Classification Search
USPC ....................................................... 370/252
See application file for complete search history.

(56) References Cited

U.S. PATENT DOCUMENTS

| | | | |
|---|---|---|---|
| 2008/0207209 A1* | 8/2008 | Katori et al. ................. 455/447 |
| 2009/0290514 A1* | 11/2009 | Muharemovic ....... H04W 48/12 |
| | | | 370/256 |
| 2010/0238845 A1* | 9/2010 | Love et al. .................. 370/280 |
| 2011/0149813 A1* | 6/2011 | Parkvall ............... H04B 7/2656 |
| | | | 370/280 |
| 2011/0211503 A1* | 9/2011 | Che ....................... H04L 5/0005 |
| | | | 370/280 |
| 2012/0115469 A1 | 5/2012 | Chen et al. |
| 2013/0142288 A1* | 6/2013 | Dinan ................. H04L 27/2649 |
| | | | 375/340 |
| 2013/0194982 A1* | 8/2013 | Fwu .................... H04W 72/085 |
| | | | 370/280 |
| 2014/0086089 A1* | 3/2014 | Huang et al. ................. 370/252 |
| 2014/0160967 A1* | 6/2014 | Gao ...................... H04W 24/10 |
| | | | 370/252 |

FOREIGN PATENT DOCUMENTS

| | | |
|---|---|---|
| CN | 102387528 A | 3/2012 |
| CN | 102652442 A | 8/2012 |
| EP | 2665305 A1 | 11/2013 |
| FI | WO 2013056445 A1 * 4/2013 ........... H04B 7/2656 |
| WO | 2008127185 A1 | 10/2008 |
| WO | 2012064070 A2 | 5/2012 |
| WO | 2012095023 A1 | 7/2012 |

OTHER PUBLICATIONS

International Search Report for PCT Application No. PCT/CN2012/085238, May 9, 2013, p. 2.

* cited by examiner

| | Radio Frame 0 | | | | | | | | | |
|---|---|---|---|---|---|---|---|---|---|---|
| | 0 | 1 | 2 | 3 | 4 | 5 | 6 | 7 | 8 | 9 |
| Cell 1 | D | S | U | U | U | D | S | U | U | D |
| Cell 2 | D | S | U | U | D | D | S | U | U | D |

Fig. 3

| | Radio Frame m | | | | | | | | | | | Radio Frame k | | | | | | | | | |
|---|---|---|---|---|---|---|---|---|---|---|---|---|---|---|---|---|---|---|---|---|---|
| | 0 | 1 | 2 | 3 | 4 | 5 | 6 | 7 | 8 | 9 | | 0 | 1 | 2 | 3 | 4 | 5 | 6 | 7 | 8 | 9 |
| Cell 1 | D | S | U | U | D/U | D | S | U | U | D | ... | D | S | U | U | D | D | S | U | U | D |
| Cell 2 | D | S | U | U | D | D | S | U | U | D | .... | D | S | U | U | D/U | D | S | U | U | D |

Fig. 4

| | Radio Frame m | | | | | | | | | | | Radio Frame k | | | | | | | | | |
|---|---|---|---|---|---|---|---|---|---|---|---|---|---|---|---|---|---|---|---|---|---|
| | 0 | 1 | 2 | 3 | 4 | 5 | 6 | 7 | 8 | 9 | | 0 | 1 | 2 | 3 | 4 | 5 | 6 | 7 | 8 | 9 |
| Cell 1 | D | S | U | U | D | D | S | U | U | D | ... | D | S | U | U | D | D | S | U | U | D |
| Cell 2 | D | S | U | U | D | D | S | U | U | D | .... | D | S | U | U | D | D | S | U | U | D |

Fig. 5

| | Radio Frame 0 | | | | | | | | | |
|---|---|---|---|---|---|---|---|---|---|---|
| | 0 | 1 | 2 | 3 | 4 | 5 | 6 | 7 | 8 | 9 |
| Cell 1 | D | S | U | U | U | D | S | U | U | D |
| Cell 2 | D | S | U | U | D | D | S | U | U | D |

Fig. 6

METHODS AND RADIO NETWORK NODES FOR MEASURING INTERFERENCE

TECHNICAL FIELD

The present invention relates generally to radio communication systems, such as telecommunication systems, and particularly to a first radio network node and a method therein for measuring interference as well as a second radio network node, and a method therein for enabling the first radio network node to measure interference.

BACKGROUND

Time Division Duplex (TDD) is flexible in terms of possibility to adapt time resources between uplink and downlink transmissions, i.e. between number of uplink and downlink subframes. By dynamically changing a ratio between the number of subframes for uplink and downlink, respectively, such as to match the instantaneous traffic situation, performance experienced by an end-user may be improved. The ratio between uplink/downlink subframes is determined by an uplink/downlink (UL/DL) configuration, referred to as TDD configuration hereinafter, of a radio base station.

Another benefit of dynamic TDD is network energy savings, i.e. an improvement of downlink resource utilization allows a radio base station, such as an evolved Node B (eNB), to configure DL subframes more efficiently so that energy savings may be achieved.

A heterogeneous network may typically comprise macro nodes and micro nodes. The macro nodes have a higher transmit power than the micro nodes. In general, it is not preferable to change the TDD configuration for the macro nodes, at least not on a small time scale. However, for heterogeneous networks, it may be that only a few user equipments (UEs) are active simultaneously per micro node, which implies a high possibility that many neighbouring nodes, or cells, are momentarily empty. The traffic dynamics are expected to be large with relatively low average load, but high instantaneous data rates. It this case, the traffic asymmetry between uplink and downlink directions may become a significant. Therefore, dynamic TDD configuration becomes attractive.

When the neighbouring nodes are configured with different TDD configurations, interference between UL and DL including both eNB-to-eNB (DL-to-UL) and UE-to-UE (UL-to-DL) interference needs to be considered. The cross-link interference should be either mitigated or avoided so that the benefit of dynamic TDD could be achieved.

In scenarios of dynamic uplink and downlink (UL/DL) allocation in a TDD cellular system, different neighbouring eNBs will use different TDD configurations from time to time. As an example, a certain cell could become an 'aggressor cell', which uses a configuration different from a neighbouring 'victim cell'. For instance, in a specific subframe, there is a DL subframe of the aggressor cell, while in the same specific subframe, there is a UL subframe for the victim cell. Hence, in the specific subframe, the uplink of victim cell will be interfered by eNB-to-eNB interference from the aggressor cell. A problem is, hence, how to measure and estimate the eNB-to-eNB interference.

SUMMARY

One object of the solution described herein is to measure interference between radio network nodes in a radio communication system.

According to one aspect, the object is achieved by a method in a first radio network node for measuring interference between the first radio network node and a second radio network node. The first radio network node obtains configuration information for indicating a designated subframe in which a reference signal for measurement of the interference is to be transmitted by the second radio network node. The designated subframe is designated for enabling measurement of the interference. The first radio network node receives, from the second radio network node in the designated subframe indicated by the configuration information, the reference signal. The first radio network node determines a value of the interference based on the reference signal.

According to another aspect, the object is achieved by a first radio network node configured to measure interference between the first radio network node and a second radio network node. The first radio network node comprises a processing circuit configured to obtain configuration information for indicating a designated subframe in which a reference signal for measurement of the interference is to be transmitted by the second radio network node. The designated subframe is designated for enabling measurement of the interference. Furthermore, the processing circuit is configured to receive, from the second radio network node in the designated subframe indicated by the configuration information, the reference signal. Moreover, the processing circuit is configured to determine a value of the interference based on the reference signal.

According to a further aspect, the object is achieved by a method in a second radio network node for enabling a first radio network node to measure interference between the first radio network node and the second radio network node. The second radio network node obtains configuration information for configuring a designed subframe for transmission of a reference signal, the designated subframe being designated for enabling the first radio network node to measure the interference. The second radio network node sends, in the designated subframe, the reference signal to the first radio network node.

According to a still further aspect, the object is achieved by a second radio network node configured to enable a first radio network node to measure interference between the first radio network node and the second radio network node. The second radio network node comprises a processing circuit configured to obtain configuration information for configuring a designed subframe for transmission of a reference signal. The designated subframe is designated for enabling the first radio network node to measure the interference. Furthermore, the processing circuit is configured to send, in the designated subframe, the reference signal to the first radio network node.

Since both the first and second radio network nodes obtains the configuration information, the first and second radio network nodes are aligned, e.g. in time and/or frequency, with regard to when interference measurement by the first radio network node may be performed.

Then, the first radio network node receives, in the designated subframe, the reference signal from the second radio network node. The designated subframe may be a flexible uplink/downlink subframe, a special subframe or the like. The special subframe is known from 3GPP terminology.

Based on the reference signal, the first radio network node determines a value of the interference between the first and second radio network nodes. Hence, in this example, a measurement of the interference is performed by obtaining the configuration information, receiving the reference signal and determining the value of the interference. As a result, the above mentioned object is achieved.

Advantageously, no or little coordination between the first and second radio network nodes is required.

Moreover, embodiments herein beneficially provide means for measuring interference caused by different TDD configurations.

As a further advantage, the embodiments herein may be implemented while having a negligible impact on Hybrid Automatic Repeat reQuest (HARQ) timing.

Furthermore, embodiments herein enable accurate eNB-to-eNB interference measurements to support any eNB-to-eNB interference management scheme, such as Inter-Cell Interference Cancellation (ICIC) or the like.

Additionally, embodiments herein may for example be implemented within current and/or future 3GPP specifications.

BRIEF DESCRIPTION OF THE DRAWINGS

The various aspects of the embodiments disclosed herein, including particular features and advantages thereof, will be readily understood from the following detailed description and the accompanying drawings, in which:

FIG. 3 is a table illustrating an aggressor cell and a victim cell, FIG. 4 is a table illustrating exemplifying TDD configurations, FIG. 5 is a table illustrating exemplifying TDD configurations, FIG. 6 is a table illustrating exemplifying TDD configurations.

DETAILED DESCRIPTION

Figure 1:
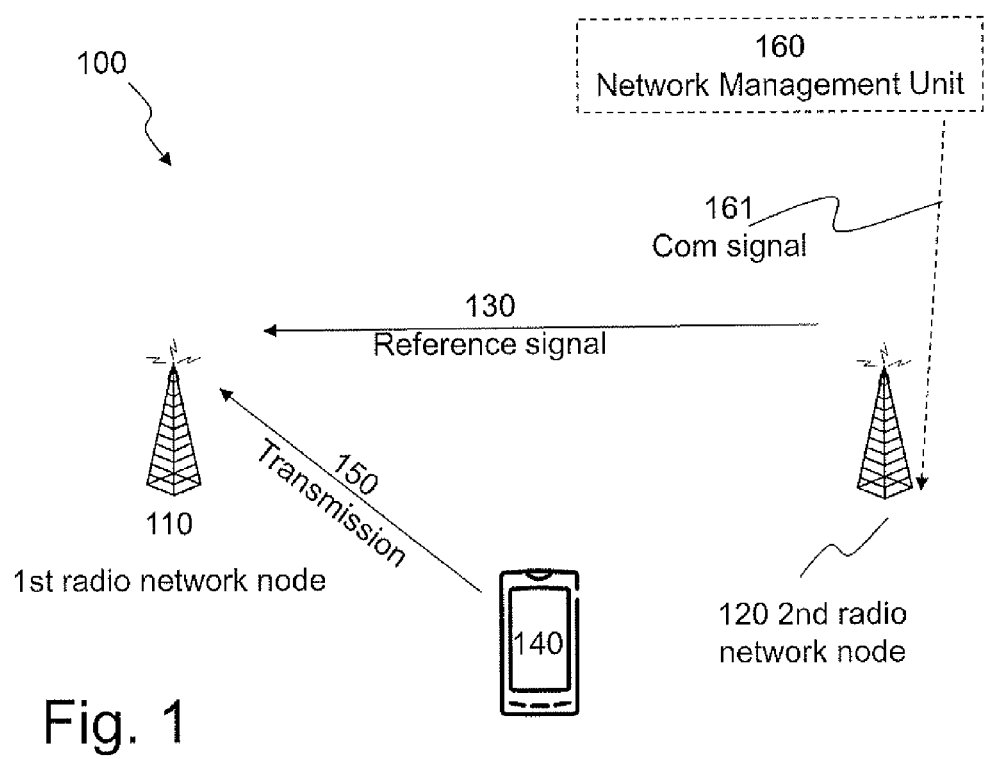
FIG. 1 is a schematic block diagram illustrating embodiments in an exemplifying radio communication system.

Throughout the following description similar reference numerals have been used to denote similar elements, network nodes, parts, items or features, when applicable. In the Figures, features that appear in some embodiments are indicated by dashed lines.

FIG. 1 depicts an exemplifying radio communications system 100 in which embodiments herein may be implemented. In this example, the radio communications system 100 is a Long Term Evolution (LTE) system. In other examples, the radio communication system may be any wireless system including those based on 3GPP cellular communication systems, such as a Wideband Code Division Multiple Access (WCDMA) network, a Global System for Mobile communication (GSM network), IEEE 802.16 family of wireless-networks standards, Worldwide Interoperability for Microwave Access (WiMAX), Wireless Local Network (WLAN) or the like.

The radio communication system 100 comprises a first radio network node 110 and a second radio network node 120. As used herein, the term "radio network node" may refer to an evolved Node B (eNB), a control node controlling one or more Remote Radio Units (RRUs), a radio base station, an access point, a relay or the like. The second radio network node 120 is configured to send 130 a reference signal to the first radio network node 110.

In this example, the first radio network node 110 is configured to operate in time division duplex mode. In other examples, the first radio network node 110 may be configured to operate in frequency division duplex mode or in a combined time/frequency duplex mode.

In this example, the second radio network node 120 is configured to operate in time division duplex mode. In other examples, the second radio network node 120 may be configured to operate in frequency division duplex mode or in a combined time/frequency duplex mode.

The first radio network node 110 may operate a first cell, such as a macro cell, and the second radio network node 120 may operate a second cell, such as a pico or micro cell. More generally, the first and second cells may be comprised in the radio communication system 100. In some examples, the first and second cells are comprised in a heterogeneous network comprised in the radio communication system 100.

Furthermore, a user equipment 140 is served by the first radio network node 110. Expressed differently, the user equipment 140 may be associated with the first cell. The user equipment 131 may transmit 150 a transmission to the first radio network node 110. As used herein, the term "user equipment" may refer to a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic switch, a microphone, a loudspeaker, a camera sensor etc.

Furthermore, the radio communication system 100 comprises a network management unit 160 for controlling for example the first and second radio network nodes 110, 120. The network management unit 160 may be configured to send 161 a communication signal. In some embodiments, the network management unit 160 is an entity for handling information about subscription of the user of the user equipment 120, about user equipment context and/or about mobility of the user equipment 120, e.g. a Mobility Management Entity (MME). In some embodiments, the network management unit 160 is an entity responsible for operation and maintenance (O&M) tasks, e.g. an O&M node such as an Operation Support System (OSS). In some embodiments, the network management unit 160 is an entity for handling user plane traffic, such as a Serving Gateway (SGW). Thus, the network management unit 160 may be e.g. an O&M node/system, MME or SGW.

According to embodiments herein, methods and measurement patterns for eNB-to-eNB interference measurement are described. Based on a given measurement pattern, such as a transmission and reception (Tx/Rx) configuration pattern for a subframe or parts of a subframe, radio network nodes may measure interference without any coordination or only little coordination.

Figure 2:
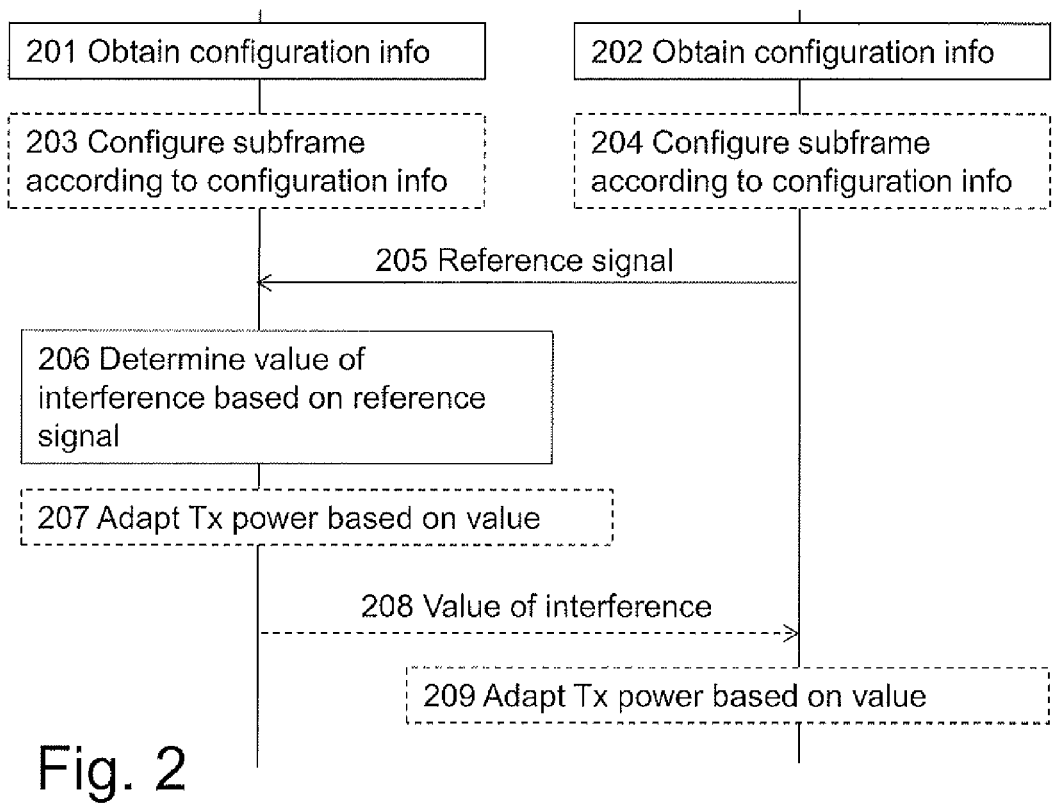
FIG. 2 is a combined signaling scheme and flowchart illustrating embodiments of the methods.

FIG. 2 illustrates an exemplifying method for measuring interference between the first radio network node 110 and the second radio network node 120 when implemented in the radio communication system 100 of FIG. 1.

The interference is to be measured at a carrier frequency of the first and second radio network nodes 110, 120. In more detail, the carrier frequency may relate to the first and second cells.

It shall be understood that the following example is given with reference to only two radio network nodes 110, 120 for the sake of simplicity. The embodiments herein may be readily applied to three, four or more radio network nodes, or cells.

The following actions may be performed in any suitable order.

Action 201

In order to align, e.g. in terms of time and/or frequency, the first and second radio network nodes 110, 120 such that the first and second radio network node 110, 120 are aware of when a measurement of the interference may be performed, action 201 and action 202 below provides the same, or similar, configuration information to the first radio network node 110 and the second radio network node 120.

Thus, the first radio network node 110 obtains configuration information for indicating a designated subframe in which a reference signal for measurement of the interference is to be transmitted by the second radio network node 120. The designated subframe is designated for enabling measurement of the interference. Thanks to the configuration information the first radio network node 110 is knows when and/or where the reference signal is sent. The configuration information is used in action 205.

The configuration information provided to the first radio network node 110 may be similar to, or corresponding to, the configuration information provided to the second radio network node 120 in that when the first radio network node 110 is in a receiving mode, in part of or in the entire designated subframe, the second radio network node 120 may be in a transmitting mode, in part of or in the entire designated subframe, for transmission of reference signals. The transmission of reference signals is described in action 205.

In some examples, the configuration information may be predetermined. In these examples, the first radio network node 110 may obtain the configuration information by determining the configuration information based on an identifier for identifying the first radio network node 110.

The identifier for identifying the first radio network node 110 may comprise one or more of: a cell identity; Internet Protocol IP address; Public Land Mobile Network identity (PLMN ID); measurement periodicity; geographical information of the first radio network node 110 and the second radio network node 120; downlink/uplink Time Division Duplex configuration (DL/UL TDD configuration) or the like.

The cell identity may be a Physical Cell Identity (PCI), which provides a unique identity each cell handled by the first radio network node 110. In other examples, the cell identity is a global cell identity which is unique within the radio communication system 100.

In some other examples, the configuration information may be determined by a central node, such as the network management unit 160. Therefore, the first radio network node 110 may obtain the configuration information by receiving the configuration information from the network management unit 160.

Action 202

The second radio network node 120 obtains configuration information for configuring a designed subframe for transmission of a reference signal. The designated subframe is designated for enabling the first radio network node 110 to measure the interference.

Similarly to action 201, the configuration information may be pre-determined or received from the network management unit 150.

Hence, the second radio network node 120 may obtain the configuration information by determining the configuration information based on an identifier for identifying the second radio network node 120.

The identifier for identifying the second radio network node 120 may comprise one or more of: a cell identity; Internet Protocol IP address; Public Land Mobile Network identity (PLMN ID); measurement periodicity; geographical information of the first radio network node 110 and the second radio network node 120; and downlink/uplink Time Division Duplex configuration.

Alternatively or additionally, the second radio network node 120 may obtain the configuration information by receiving the configuration information from the network management unit 160.

Action 203

According to some first embodiments, the designated subframe may be a flexible uplink and/or downlink subframe. The designated subframe is defined by that the entire subframe, or parts thereof, e.g. symbols, may selectively, by the first radio network node 110, be put in reception or transmission mode. As an example, the designated subframe may be a Flexible uplink/DownLink subframe (FDL subframe). The FDL subframe may be either an uplink subframe or a downlink subframe as selected by the first radio network node 110. Expressed somewhat differently, the FDL subframe may be flexibly configured into a downlink subframe or an uplink subframe by a radio network node, such as the first radio network node 110 or the second radio network node 120.

Therefore, the configuration information may indicate to the first radio network node 110 that the flexible uplink and/or downlink subframe is to be configured as an uplink subframe when the interference is to be measured.

The first radio network node 110 may obtain the configuration information by configuring the flexible uplink and/or downlink subframe as the uplink subframe indicated by the configuration information.

According to some second embodiments, the designated subframe may be a special subframe known from 3GPP terminology. The special subframe may comprise an uplink timeslot, a downlink timeslot and a guard period between the uplink and downlink timeslots. The term "timeslot" may comprise one or more symbols in the time domain. Similarly, the term "guard period" may comprise one or more symbols in the time domain. The term "symbol" may refer to an Orthogonal Frequency-Division Multiplexing (OFDM) symbol or the like.

The configuration information may indicate to the first radio network node 110 that the special subframe is to be configured according to a subframe configuration.

The first radio network node 110 may obtain the configuration information by configuring the special subframe according to the subframe configuration indicated by the configuration information. A first downlink timeslot of the first radio network node (110) may be shorter than a second downlink timeslot of the second radio network node (120).

In some examples, the subframe configuration may for example be "Mode 4" in accordance with 3GPP TS 36.211. In other examples, the subframe configuration is any other mode according to for example 3GPP TS 36.211 or similar future 3GPP specifications. Any mode is feasible, if a so called Downlink Pilot TimeSlot (DwPTS) of the designated subframe in the second radio network node 120 is longer than the DwPTS of the designated subframe in the first radio network node 110. For example, a measured cell, such as the second cell of the second radio network node 120, uses "Mode 1", as specified in 3GPP TS 36.211, and a measuring cell, such as the first cell of the first radio network node 110, uses Mode 5, is also feasible. Therefore, it may be said that the subframe configuration information for the designated subframe of the first radio network node 110 may indicate a first subframe configuration according to which the first downlink timeslot, such as DwPTS, has a first length, or duration in e.g. ms. In connection wherewith, the subframe configuration information for the designated subframe of the second radio network node 120 may indicate a second subframe configuration according to which the second downlink timeslot, such as DwPTS, has a second length, or duration in e.g. ms. The first length may be shorter than the second length such as to allow measurement of the interference.

In these examples, in "Mode 1", 9 OFDM symbols are used in the measured cell, while 3 OFDM symbols are configured in the measuring cell according to the specification TS 36.211. Hence, OFDM symbols 4-9 may be used for measurement.

The configuring, according to the first embodiments and/or the second embodiments, may be performed based on a need for measurement of the interference. As an example, if an indication of the need is above a threshold value relating to the need, then the first radio network node 110 configures the designated subframe as the uplink subframe, whereby reception, in action 205, of the reference signal is enabled. In turn, this implies that action 206 may be performed.

The need may occur due to that the value of the interference value is old, i.e. the time past since last determination of the value, see action 206, is above a threshold value.

In other examples, the need may occur when a Block Error Rate (BLER) is above a threshold value for BLER. That is to say the BLER is bad. The BLER may be said to be good when the BLER is below the threshold value for BLER.

For example, if BLER is good and there is a lot of data to transmit, the measuring node may decide to use the designated subframe in which measurement is possible for downlink transmission, for example towards the user equipment 140, instead.

Similarly, for example, if BLER is good and there is a lot of data to receive, the first radio network node 100 may decide to use the designated subframe for uplink transmission from the user equipment 140 instead of transmission of reference signals from the second radio network node 120.

In other examples, the value of the interference is used for interference management. During for example a low load scenario or for user equipments in the so called cell range extension, the designated subframe may be configured into an uplink subframe, which may be a completely empty subframe if desired. In contrast, CRS is always transmitted in a downlink subframe. Thus, if the designated subframe is configured as an uplink subframe the interference may be reduced thanks to that no CRS is transmitted. With this configuration, no interference comes from this subframe.

Action 204

According to some first embodiments, the designated subframe may comprise a flexible uplink and/or downlink subframe.

The configuration information may indicate to the second radio network node 120 that the flexible uplink and/or downlink subframe is to be configured as a downlink subframe.

In these embodiments, the second radio network node 120 may obtain the configuration information by configuring the flexible uplink and/or downlink subframe as the downlink subframe indicated by the configuration information.

According to some second embodiments, the designated subframe may be a special subframe. The special subframe may comprise an uplink timeslot, a downlink timeslot and a guard period between the uplink and downlink timeslots.

The configuration information may indicate to the second radio network node 120 that the special subframe is to be configured according to a subframe configuration. The first downlink timeslot of the first radio network node (110) may be shorter than the second downlink timeslot of the second radio network node (120).

In these embodiments, the second radio network node 120 may obtain the configuration information by configuring the special subframe according to the subframe configuration indicated by the configuration information.

It may be noted that according to preferred embodiments, the second radio network node 120 does always transmit the reference signal. Thus, the decision on whether or not to perform a measurement is left solely to the first radio network node 110. In contrast, the first radio network node 110 performs action 203 based on the need for measurement of the interference as explained above.

Action 205

In order to measure the interference, e.g. from the second radio network node 120 towards the first radio network node 110, the second radio network node 120 sends, in the designated subframe, the reference signal to the first radio network node 110.

As explained above in conjunction with action 203, it is up to the first radio network node 110 to decide whether or not to configure, at least partially, the designated subframe for reception of the reference signal. Again, when the designated subframe is partially configured for reception, some symbols of the designated subframe are uplink symbols, i.e. reception is possible, and some symbols of the designated subframe are downlink symbols. Also as mentioned, the designated subframe may be an uplink subframe, in which reception is possible.

Action 206

The first radio network node 110 determines a value of the interference based on the reference signal. In this manner, the first radio network node 110 completes, or finalizes, the measurement of the interference.

The value of the interference may be represented by one or more of: a Channel Quality Indicator (CQI), a Signal-to-Interference-and-Noise-Ratio (SINR), a Signal-to-Interference-Ratio (SIR), a Signal-to-Noise-Ratio (SNR), a Reference Signal Received Power (RSRP), a Reference Signal Received Quality (RSRQ), a Received Signal Strength Indicator (RSSI) and the like.

The first radio network node 110 may need to obtain information about transmission power of the reference signals from the second radio network node according to known methods.

Action 207

The first radio network node 110 may adapt transmit power, Tx power, of the first radio network node 110 based on the value. Typically, when the value of interference is above a threshold for the value of interference, the transmit power of the first radio network node 110 is increased. Likewise, when the value of interference is below the threshold for the value of interference, the transmit power of the first radio network node 110 may be decreased.

If action 207 is performed, thus adjusting Tx power of the first radio network node 110, it may be that it is not necessary to also adjust the Tx power of the second radio network node 120 as in action 209. Hence, action 208 and 209 need not be performed after action 207 has been performed. Advantageously, less information is transmitted.

Action 208

The first radio network node 110 may send the value of the interference to the second radio network node 120. Thereby, the second radio network node 120 may use the value in action 209.

The value of the interference may be represented by one or more of: Channel Quality Indicator, Signal-to-Interference-and-Noise-Ratio, Signal-to-Interference-Ratio, Signal-to-Noise-Ratio, Reference Signal Received Power, Reference Signal Received Quality, and Received Signal Strength Indicator and the like.

Action 209

The second radio network node 120 may adapt transmit power of the second radio network node 120 based on the value. Typically, when the value of interference is above a second threshold for the value of interference, the transmit power of the second radio network node 120 is decreased. Likewise, when the value of interference is below the second threshold for the value of interference, the transmit power of the second radio network node 120 may be increased.

Some further details with reference to action 203 and 204 will now be described.

In order to measure eNB-to-eNB interference at the designated subframe, the second radio network node 120 shall be in Tx mode, i.e. at least the symbol(s) carrying the reference signal shall be in Tx mode. The first radio network node 110 shall be to be in Rx mode, i.e. at least those symbols during which the reference signal is sent by the second radio network node 120 shall be in Rx mode. Therefore, Tx and Rx modes in subframes of different cells are relevant each other for the measurement of the interference. The alignment of the Tx/Rx modes of the first and second radio network nodes 110, 120, e.g. a measured cell and a measuring cell, is necessary.

In order to align the Tx/Rx modes without a real-time online coordination during operation, it is herein described how the Tx/Rx modes of different cells at the designated subframe, and possibly also at a specific radio frame number, may be pre-defined according to the cell identifier, TDD configuration and other parameters, e.g. PLMN ID, IP address or the like.

The specific radio frame number i of DL Tx for the measured cell is defined as follows:

$$i = f_1(id, M, DL/UL\text{conf}, \text{Timing})$$

where id may be a physical cell identifier (PCI), IP address, PLMN ID or any identifier which can identify the measured cell, M is the measurement period, and DL/UL conf is the DL/UL TDD configuration and special subframe configuration, Timing refers to global timing, i.e, obtained from GPS, or from core network. One simple example of the function $f_1(\bullet)$ is:

$$i = (\text{cellid} + k*N) \bmod (1024) \, k = 0, 1, \ldots$$

N is a pre-set periodicity, and the periodicity can be from seconds to minutes, or even hours. The period can be set according to the eNB-to-eNB interference time-domain variation characteristics.

In the corresponding subframe, and optionally also radio frame number, given above, the measuring cell can be configured into Rx mode to estimate eNB-to-eNB interference.

In general, the above method may be extended to a method based on geographical information of each eNBs instead of PCI or any other identification number other than PCI.

FIG. 3 shows exemplifying TTD configurations for the first cell "Cell 1" and the second cell "Cell 2". The terms "victim cell" and "aggressor cell" are explained and illustrated. In the Figure, a radio frame 0 "Radio Frame 0" comprises 10 subframes, denoted by reference numerals 0-9. In a fourth subframe 4 the first cell "Cell 1" is configured with an uplink subframe U and the second cell "Cell 2" is configured with a downlink subframe D. Thereby, the first cell may receive transmission from the second cell. This means that the first cell becomes a victim cell and the second cell becomes an aggressor cell. Additionally, special subframes S are shown in subframe 1 and 6.

FIG. 4 illustrates an exemplifying TDD configuration according to the first embodiments, in which the designated subframe may be a FDL subframe. The same or similar reference numerals denote the same or similar cells, radio frames or the like as in FIG. 3.

In this example, subframe 4 is a pre-determined, or pre-set, subframe for flexible DL/UL. In order to measure eNB-to-eNB interference, in radio frame m, cell 2 operates in DL according to aforementioned TDD configuration, while cell 1 is configured to either DL or UL as determined by the first radio network node 110, e.g. depending on traffic status, or load on the first cell. If cell 1, e.g. the first radio network node 110, needs to estimate interference between Cell 2 to its own cell "Cell 1", at the corresponding subframe, it is configured into an UL subframe for receiving the reference signal from the second cell, e.g. the second radio network node 120.

Similarly, in another radio frame occasions, i.e., radio frame k, Cell 1 is predetermined to Tx for DL and the second cell is configured to be UL if interference estimation is needed. Otherwise, the configurations can be flexible.

FIG. 5 illustrates an exemplifying TDD configuration according to the second embodiments, in which the designated subframe may be a special subframe. The same or similar reference numerals denote the same or similar cells, radio frames or the like as in FIG. 3.

As an example, at a special subframe S of radio frame m in subframe 1, a first number of DL OFDM symbols of cell 2 are configured. Furthermore, a second number of DL OFM symbols of cell 1 are configured. Here, the first number of DL OFDM symbols is greater than the second number of DL OFDM symbols. In one or more of the subframes corresponding to those DL OFDM symbols which are in excess compared to the second number of DL OFDM symbols, the first cell may measure eNB-to-eNB interference measurement. In another radio frame, i.e., radio frame k, more DL OFDM symbols are configured in the special subframe of cell 1, and thus the second cell may conduct eNB-to-eNB interference measurement when needed.

FIG. 6 illustrates an exemplifying TDD configuration according to the first embodiments, in which the designated subframe may be a FDL subframe. The same or similar reference numerals denote the same or similar cells, radio frames or the like as in FIG. 3.

As shown in FIG. 6, the first radio network node 110, "Measuring node", may wish to measure the eNB-to-eNB interference from the second radio network node 120 "Measured node". Assume subframe 4 is the FDL subframe, the following configuration and procedure may be used for eNB-to-eNB interference measurement.

A Tx/Rx configuration pattern relates to a pattern according to which the designated subframe is configured as a DL subframe, whereby measurement by the first radio network node 110 is possible. In this example, the Tx/Rx configuration pattern is applied, by the second radio network node 120, to the FDL subframe.

The Tx/Rx configuration pattern for the FDL subframe may be predetermined by utilizing the identifier based alignment as described in action 201 and 202 in FIG. 2. Hence, no further coordination between the first and second radio network nodes is required.

Alternatively or additionally, the Tx/Rx configuration pattern for the FDL subframe may be determined by coordination/mutual negotiations between the first and second radio network nodes 110, 120.

According to the Tx/Rx configuration pattern determined, the second radio network node 120 has configured the FDL subframe as a DL subframe. See subframe 4 of cell 2. In this DL subframe, the reference signal, such as a Cell-specific Reference Signal (CRS), a Channel State Information Reference Signal (CSI-RS) or the like, is transmitted.

For the first radio network node 110, the FDL subframe is configured into UL subframe for reception of the reference signal when needed. In this UL subframe, the first radio network node 110 is in Rx mode. The first radio network node 110 estimates the eNB-to-eNB interference from the reference signal (RS) transmitted by the second radio network node.

Figure 7:
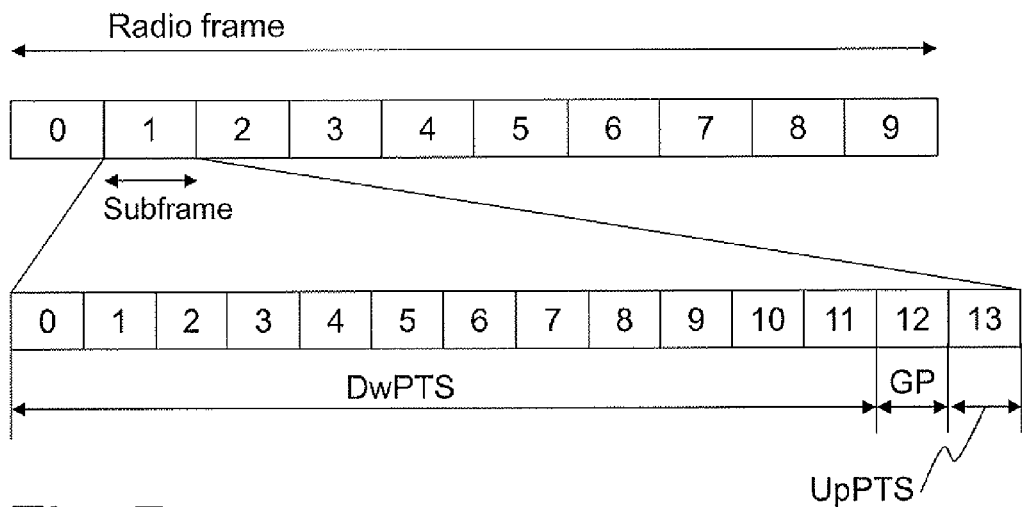
FIG. 7 is a block diagram illustrating an exemplifying designated subframe.
Figure 8:
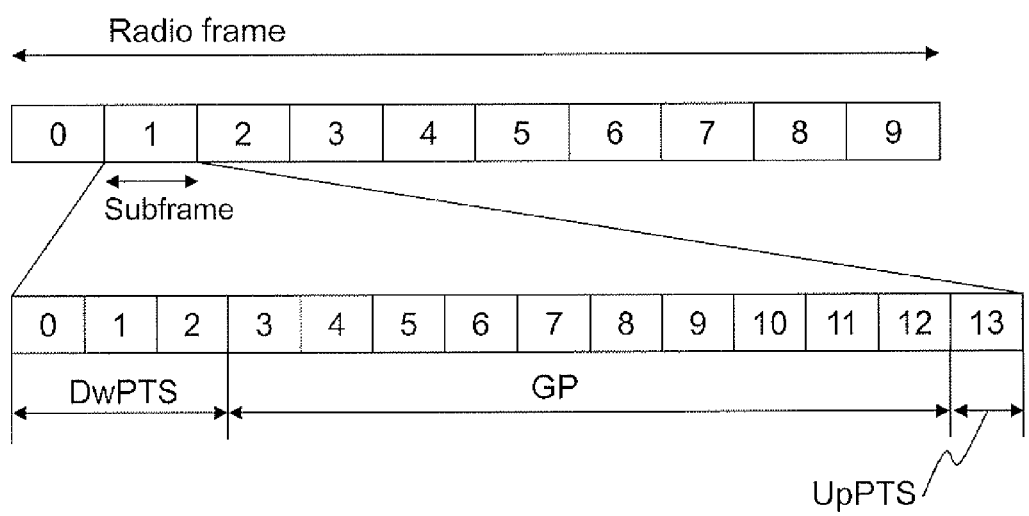
FIG. 8 is a block diagram illustrating an exemplifying designated subframe.

FIGS. 7 and 8 show exemplifying designated subframes according to the second embodiment.

In FIG. 7, an example of the special subframe is shown. The first radio network node 110 "Measuring node" may wish to measure the eNB-to-eNB interference from the second radio network node 120 "Measured node". Then, the following configuration and procedure may be used for eNB-to-eNB interference measurement.

The Tx/Rx configuration pattern for the special subframe may be predetermined by utilizing the identifier based alignment as described in action 201 and 202 in FIG. 2. Hence, no further coordination between the first and second radio network nodes is required.

Alternatively or additionally, the Tx/Rx configuration pattern for the special subframe may be determined by coordination/mutual negotiations between the first and second radio network nodes 110, 120.

According to the Tx/Rx configuration pattern determined, the second radio network node 120 transmits the reference signal in a certain special subframe, for example in a DwPTS time slot at a TD-LTE frame. This special subframe configuration is set as mode 4 and is standardized in LTE specification TS36.211.

Other special sub-frame configurations, according to for example TS36.211, can also be used if there are enough available reference signals in the corresponding configuration. The structure of the special sub-frame is illustrated in FIG. 7 with a normal cyclic prefix.

Now referring to FIG. 8, for the first radio network node 110, OFDM symbol 0 to 2 are the so called Downlink Pilot TimeSlot (DwPTS) in the special subframe. This means that OFDM symbol 0 to 2 are DL symbols. In contrast, OFDM symbol $13^{th}$ is an UL symbol, and OFDM symbol $12^{th}$ GP is a guard period, i.e. here just one symbol, for switching from downlink to uplink. The GP duration is much longer than that of the second radio network node 120, during most of which the second radio network node 120 conducts a DL Tx.

Thus, the first radio network node 110 may receive the OFDM symbol 3 to 11 sent from the second radio network node 120, where OFDM symbol 4, 7 and 11 have the DL cell specific reference signal (CRS) or other reference signals. Then first radio network node 110 can estimate signal strength of second radio network node 120 by processing received signals at OFDM symbol 4, 7 and 11. The configuration in FIG. 8 is just one example. The guard period (GP) can be reduced according to the network. If the guard period is reduced, less OFDM symbols may be used for interference measurement, or interference estimation.

After the eNB-to-eNB interference is estimated according any one of the examples described herein, e.g. with reference to FIG. 6 or FIGS. 7 and 8, the first radio network node 110 may signal, or send, the measurement results, i.e. the value of the interference, to the second radio network node 120 e.g. via a backhaul connection such as X2 link. See action 208. The second radio network node 120 takes action to handle transmit power control based on the feedback in terms of the value of the interference. See action 209.

By exploiting channel reciprocity, the first radio network node 110 may also adapt its own power control strategy based on the value of the interference. In this manner, the first radio network node 110 controls its own Tx power to reduce the interference towards the second radio network node 120 based on e.g. a pre-defined rule. See action 207. In principle, any pair of radio network nodes only need only one measurement if the radio communication system 100 is homogeneous, whereby channel reciprocity is maintained and reliable.

Figure 9:
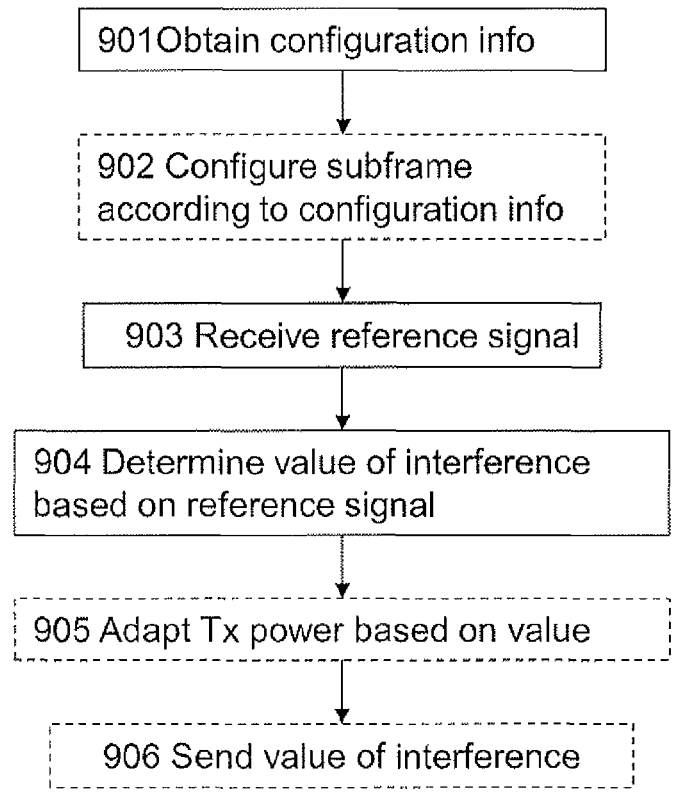
FIG. 9 is a flowchart illustrating embodiments of the method in the first radio network node.

With reference to FIG. 9, embodiments of the method in the first radio network node 110 for measuring interference between the first radio network node 110 and the second radio network node 120 are described.

The following actions may be performed in any suitable order.

Action 901

The first radio network node 110 obtains configuration information for indicating a designated subframe in which a reference signal for measurement of the interference is to be transmitted by the second radio network node 120. The designated subframe is designated for enabling measurement of the interference. This action is similar to action 201.

The first radio network node 110 may obtain the configuration information by determining the configuration information based on an identifier for identifying the first radio network node 110.

The identifier for identifying the first radio network node 110 may comprise one or more of: a cell identity; Internet Protocol IP address; Public Land Mobile Network identity; measurement periodicity; geographical information of the first radio network node 110 and the second radio network node 120; and downlink/uplink Time Division Duplex configuration.

The first radio network node 110 may obtain the configuration information by receiving the configuration information from the network management unit 160.

Action 902

According to the first embodiments, the designated subframe may be a flexible uplink and/or downlink subframe.

The configuration information may indicate to the first radio network node 110 that the flexible uplink and/or downlink subframe is to be configured as an uplink subframe when the interference is to be measured.

The first radio network node 110 may obtain the configuration information by configuring the flexible uplink and/or downlink subframe as the uplink subframe indicated by the configuration information.

The configuring may be performed based on a need for measurement of the interference.

According to the second embodiments, the designated subframe may be a special subframe. The special subframe may comprise an uplink timeslot, a downlink timeslot and a guard period between the uplink and downlink timeslots.

The configuration information may indicate to the first radio network node 110 that the special subframe is to be configured according to a subframe configuration.

The first radio network node 110 may obtain the configuration information by configuring the special subframe according to the subframe configuration indicated by the configuration information. A first downlink timeslot of the first radio network node (110) may be shorter than a second downlink timeslot of the second radio network node (120).

The configuring may be performed based on a need for measurement of the interference.

This action is similar to action 203.

Action 903

The first radio network node 110 receives, from the second radio network node 120 in the designated subframe indicated by the configuration information, the reference signal. This action is similar to action 205.

Action 904

The first radio network node 110 determines a value of the interference based on the reference signal. This action is similar to action 206.

The value of the interference may be represented by one or more of: Channel Quality Indicator, Signal-to-Interference-and-Noise-Ratio, Signal-to-Interference-Ratio, Signal-to-Noise-Ratio, Reference Signal Received Power, Reference Signal Received Quality, and Received Signal Strength Indicator and the like.

Action 905

The first radio network node 110 may adapt transmit power, Tx power, of the first radio network node 110 based on the value. This action is similar to action 207.

Action 906

The first radio network node 110 may send the value of the interference to the second radio network node 120. This action is similar to action 208.

Figure 10:
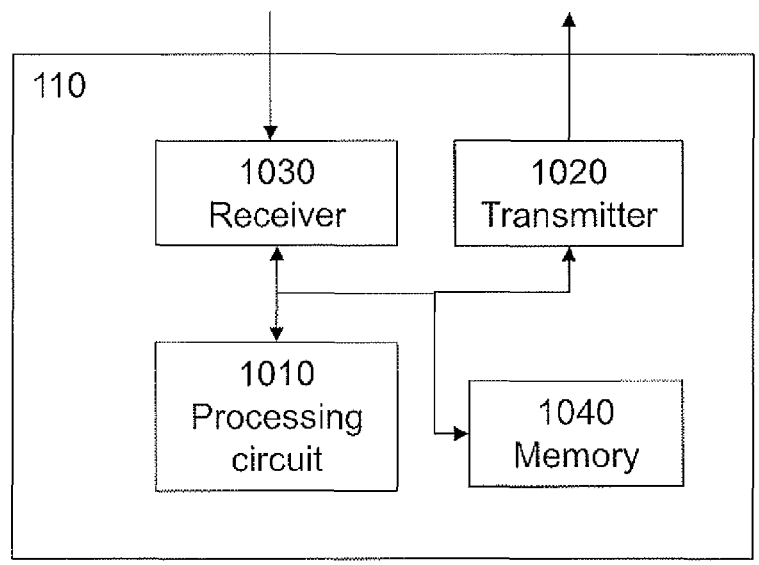
FIG. 10 is a block diagram illustrating embodiments of the first radio network node.

With reference to FIG. 10, embodiments of the first radio network node 110 when configured to perform the embodiments described herein. Thus, the network node 110, 111, 112 is configured to measure interference between the first radio network node 110 and the second radio network node 120.

The first radio network node 110 comprises a processing circuit 1010 configured to obtain configuration information for indicating a designated subframe in which a reference signal for measurement of the interference is to be transmitted by the second radio network node 120. The designated subframe is designated for enabling measurement of the interference.

Furthermore, the processing circuit 1010 is configured to receive, from the second radio network node 120 in the designated subframe indicated by the configuration information, the reference signal. Moreover, the processing circuit 1010 is configured to determine a value of the interference based on the reference signal.

The processing circuit 1010 may further be configured to determine the configuration information based on an identifier for identifying the first radio network node 110.

The processing circuit 1010 may further be configured to receive the configuration information from a network management unit 160.

The processing circuit 1010 may further be configured to send the value of the interference to the second radio network node 120.

The processing circuit 1010 may be a processing unit, a processor, an application specific integrated circuit (ASIC), a field-programmable gate array (FPGA) or the like. As an example, a processor, an ASIC, an FPGA or the like may comprise one or more processor kernels.

The identifier for identifying the first radio network node 110 may comprise one or more of: a cell identity; Internet Protocol IP address; Public Land Mobile Network identity; measurement periodicity; geographical information of the first radio network node 110 and the second radio network node 120; and downlink/uplink Time Division Duplex configuration.

The value of the interference may be represented by one or more of: a Channel Quality Indicator, a Signal-to-Interference-and-Noise-Ratio, a Signal-to-Interference-Ratio, a Signal-to-Noise-Ratio, a Reference Signal Received Power, a Reference Signal Received Quality, and a Received Signal Strength Indicator and the like.

The designated subframe may be a flexible uplink and/or downlink subframe.

The configuration information may indicate to the first radio network node 110 that the flexible uplink and/or downlink subframe is to be configured as an uplink subframe when the interference is to be measured.

The processing circuit 1010 may further be configured to configure the flexible uplink and/or downlink subframe as the uplink subframe indicated by the configuration information.

The processing circuit 1010 may further be configured to configure the flexible uplink and/or downlink subframe as the uplink subframe indicated by the configuration information based on a need for measurement of the interference.

The designated subframe may be a special subframe. The special subframe may comprise an uplink timeslot, a downlink timeslot and a guard period between the uplink and downlink timeslots.

The configuration information may indicate to the first radio network node 110 that the special subframe is to be configured according to a subframe configuration, The processing circuit 1010 may further be configured to configure the special subframe according to the subframe configuration indicated by the configuration information. A first downlink timeslot of the first radio network node (110) may be shorter than a second downlink timeslot of the second radio network node (120).

The first radio network node 110 according to claim 33, wherein the processing circuit 1010 further is configured to configure the special subframe according to the subframe configuration indicated by the configuration information based on a need for measurement of the interference.

The processing circuit 1010 may further be configured to adapt transmit power of the first radio network node 110 based on the value.

The first radio network node 110 further comprises a transmitter 1020, which may be configured to send one or more of the value of interference and other numbers, values or parameters described herein.

The first radio network node 110 further comprises a receiver 1030, which may be configured to receive one or more of the reference signal and other numbers, values or parameters described herein.

The first radio network node 110 further comprises a memory 1040 for storing software to be executed by, for example, the processing circuit. The software may comprise instructions to enable the processing circuit to perform the method in the first radio network node 110 as described above in conjunction with FIGS. 2 and/or 9. The memory may be a hard disk, a magnetic storage medium, a portable computer diskette or disc, flash memory, random access memory (RAM) or the like. Furthermore, the memory may be an internal register memory of a processor.

Figure 11:
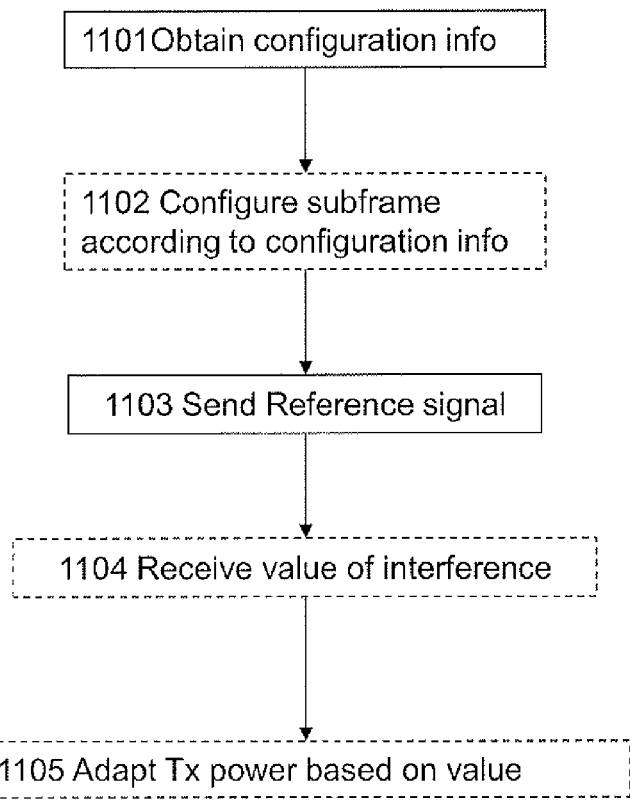
FIG. 11 is a flowchart illustrating embodiments of the method in the second radio network node.

FIG. 11 illustrates embodiments of the method in the second radio network node 120 for enabling a first radio network node 110 to measure interference between the first radio network node 110 and the second radio network node 120.

The following actions may be performed in any suitable order.

Action 1101

The second radio network node 120 obtains configuration information for configuring a designed subframe for transmission of a reference signal, the designated subframe being designated for enabling the first radio network node 110 to measure the interference. This action is similar to action 202.

The second radio network node 120 may obtain the configuration information by determining the configuration information based on an identifier for identifying the second radio network node 120.

The identifier for identifying the first radio network node 110 may comprise one or more of: a cell identity; Internet Protocol IP address; Public Land Mobile Network identity, "PLMN ID"; measurement periodicity; geographical information of the first radio network node 110 and the second radio network node 120; and downlink/uplink Time Division Duplex configuration, "DL/UL TDD configuration" and the like.

The second radio network node 120 may obtain the configuration information by receiving the configuration information from a network management unit 160.

Action 1102

According to some first embodiments, the designated subframe may comprise a flexible uplink and/or downlink subframe.

The configuration information may indicate to the second radio network node 120 that the flexible uplink and/or downlink subframe is to be configured as a downlink subframe.

In these embodiments, the second radio network node 120 may obtain the configuration information by configuring the flexible uplink and/or downlink subframe as the downlink subframe indicated by the configuration information.

According to some second embodiments, the designated subframe may be a special subframe. The special subframe may comprise an uplink timeslot, a downlink timeslot and a guard period between the uplink and downlink timeslots.

The configuration information may indicate to the second radio network node 120 that the special subframe is to be configured according to a subframe configuration. A first downlink timeslot of the first radio network node (110) may be shorter than a second downlink timeslot of the second radio network node (120).

In these embodiments, the second radio network node 120 may obtain the configuration information by configuring the special subframe according to the subframe configuration indicated by the configuration information.

This action is similar to action 204.

Action 1103

The second radio network node 120 sends, in the designated subframe, the reference signal to the first radio network node 110. This action is similar to action 205.

Action 1104

The second radio network node 120 may receive a value of the interference. This action is similar to action 208.

The value of the interference may be represented by one or more of: Channel Quality Indicator, Signal-to-Interference-and-Noise-Ratio, Signal-to-Interference-Ratio, Signal-to-Noise-Ratio, Reference Signal Received Power, Reference Signal Received Quality, Received Signal Strength Indicator and the like.

Action 1105

The second radio network node 120 may adapt transmit power of the second radio network node 120 based on the value. This action is similar to action 209.

Figure 12:
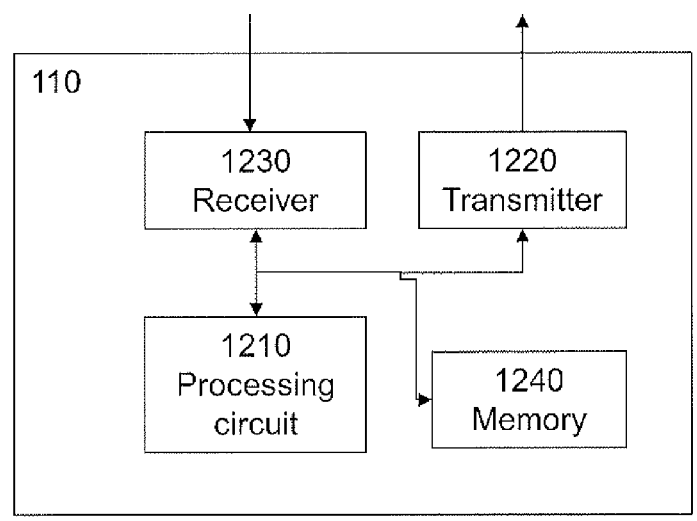
FIG. 12 is a block diagram illustrating embodiments of the second radio network node.

FIG. 12 illustrates embodiments of the second radio network node 120 when configured to perform the embodiments described herein. Thus, the second radio network node 120 is configured to enable a first radio network node 110 to measure interference between the first radio network node 110 and the second radio network node 120.

The second radio network node 120 comprises a processing circuit 1210 configured to obtain configuration information for configuring a designed subframe for transmission of a reference signal. The designated subframe is designated for enabling the first radio network node 110 to measure the interference. Furthermore, the processing circuit 1210 is configured to send, in the designated subframe, the reference signal to the first radio network node 110.

The processing circuit 1210 may further be configured to determine the configuration information based on an identifier for identifying the second radio network node 120.

The processing circuit 1210 may further be configured to receive the configuration information from a network management unit 160.

The processing circuit 1210 may further be configured to receive a value of the interference; and adapt transmit power of the second radio network node 120 based on the value.

The processing circuit 1210 may be a processing unit, a processor, an application specific integrated circuit (ASIC), a field-programmable gate array (FPGA) or the like. As an example, a processor, an ASIC, an FPGA or the like may comprise one or more processor kernels.

The identifier for identifying the first radio network node 110 may comprise one or more of: a cell identity; Internet Protocol IP address; Public Land Mobile Network identity; measurement periodicity; geographical information of the first radio network node 110 and the second radio network node 120; and downlink/uplink Time Division Duplex configuration.

The value of the interference may be represented by one or more of: a Channel Quality Indicator, a Signal-to-Interference-and-Noise-Ratio, a Signal-to-Interference-Ratio, a Signal-to-Noise-Ratio, a Reference Signal Received Power, a Reference Signal Received Quality, and a Received Signal Strength Indicator and the like.

In some embodiments, the designated subframe may be a flexible uplink and/or downlink subframe.

The configuration information may indicate to the second radio network node 120 that the flexible uplink and/or downlink subframe is to be configured as a downlink subframe In these embodiments, the processing circuit 1210 may further be configured to configure the flexible uplink and/or downlink subframe as the downlink subframe indicated by the configuration information.

In some embodiments, the designated subframe may be a special subframe. The special subframe may comprise an uplink timeslot, a downlink timeslot and a guard period between the uplink and downlink timeslots.

The configuration information may indicate to the second radio network node 120 that the special subframe is to be configured according to a subframe configuration.

In these embodiments, the processing circuit 1210 may further be configured to configure the special subframe according to the subframe configuration indicated by the configuration information. A first downlink timeslot of the first radio network node (110) may be shorter than a second downlink timeslot of the second radio network node (120).

The second radio network node 120 further comprises a transmitter 1220, which may be configured to send one or more of the reference signal and other numbers, values or parameters described herein.

The second radio network node 120 further comprises a receiver 1230, which may be configured to receive one or more of the value of interference and other numbers, values or parameters described herein.

The second radio network node 120 further comprises a memory 1240 for storing software to be executed by, for example, the processing circuit. The software may comprise instructions to enable the processing circuit to perform the method in the second radio network node 120 as described above in conjunction with FIGS. 2 and/or 11. The memory may be a hard disk, a magnetic storage medium, a portable computer diskette or disc, flash memory, random access memory (RAM) or the like. Furthermore, the memory may be an internal register memory of a processor.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

Even though embodiments of the various aspects have been described, many different alterations, modifications and the like thereof will become apparent for those skilled in the art. The described embodiments are therefore not intended to limit the scope of the present disclosure.

The invention claimed is:

1. A method in a first radio network node for measuring interference between the first radio network node and a second radio network node, the method comprising:
    obtaining configuration information that indicates which subframe is a designated subframe in which a reference signal for measurement of the interference is to be transmitted by the second radio network node, the designated subframe being designated for enabling measurement of the interference, wherein the designated subframe is a flexible uplink and/or downlink subframe;
    dynamically configuring the designated subframe in the first radio network node as an uplink subframe according to the obtained configuration information when the interference is to be measured, wherein the designated subframe is configured in the entirety or parts thereof;
    receiving, from the second radio network node in the designated subframe indicated by the configuration information, the reference signal; and
    determining a value of the interference based on the reference signal.

2. The method according to claim 1, wherein the obtaining of the configuration information comprises determining the configuration information based on an identifier for identifying the first radio network node, wherein the identifier for identifying the first radio network node comprises one or more of:
    a cell identity;
    Internet Protocol address;
    Public Land Mobile Network identity;
    measurement periodicity;
    geographical information of the first radio network node and the second radio network node; and
    downlink/uplink Time Division Duplex configuration.

3. The method according to claim 1, wherein the obtaining of configuration information comprises receiving the configuration information from a network management unit.

4. The method according to claim 1, wherein the value of the interference is represented by one or more of:
    Channel Quality Indicator,
    Signal-to-Interference-and-Noise-Ratio,
    Signal-to-Interference-Ratio,
    Signal-to-Noise-Ratio,
    Reference Signal Received Power,
    Reference Signal Received Quality, and
    Received Signal Strength Indicator.

5. The method according to claim 1, said flexible uplink and/or downlink subframe being adaptively configured as one of an uplink subframe and a downlink subframe as selected by the first or the second radio network node.

6. The method according to claim 5, wherein the configuring is performed based on a need for measurement of the interference.

7. The method according to claim 1, further comprising:
    adapting a transmit power of the first radio network node based on the value.

8. The method according to claim 1, further comprising:
    sending the value of the interference to the second radio network node.

9. A method in a second radio network node for enabling a first radio network node to measure interference between the first radio network node and the second radio network node, the method comprising:
    obtaining configuration information for configuring a designated subframe for transmission of a reference signal, the designated subframe being designated for enabling the first radio network node to measure the interference, wherein the designated subframe is a flexible uplink and/or downlink subframe, and wherein the configuration information indicates to the second radio network node that the designated subframe is to be configured as a downlink subframe;
    configuring the designated subframe as the downlink subframe indicated by the configuration information; and
    sending, in the designated subframe, the reference signal to the first radio network node.

10. The method according to claim 9, wherein the identifier for identifying the first radio network node comprises one or more of:
    a cell identity;
    Internet Protocol address;
    Public Land Mobile Network identity;
    measurement periodicity;
    geographical information of the first radio network node and the second radio network node; and
    downlink/uplink Time Division Duplex configuration.

11. The method according to claim 9, wherein the obtaining of configuration information comprises receiving the configuration information from a network management unit.

12. The method according to claim 9, said flexible uplink and/or downlink subframe being adaptively configured as one of an uplink subframe and a downlink subframe as selected by the first or the second radio network node.

13. The method according to claim 9, further comprising:
receiving a value of the interference; and
adapting transmit power of the second radio network node based on the value.

14. The method according to claim 13, wherein the value of the interference is represented by one or more of:
a Channel Quality Indicator,
a Signal-to-Interference-and-Noise-Ratio,
a Signal-to-Interference-Ratio,
a Signal-to-Noise-Ratio,
a Reference Signal Received Power,
a Reference Signal Received Quality, and
a Received Signal Strength Indicator.

15. A first radio network node configured to measure interference between the first radio network node and a second radio network node, wherein the first radio network node comprises a processing circuit configured to:
obtain configuration information that indicates which subframe is a designated subframe in which a reference signal for measurement of the interference is to be transmitted by the second radio network node, the designated subframe being designated for enabling measurement of the interference, wherein the designated subframe is a flexible uplink and/or downlink subframe;
dynamically configure the designated subframe in the first radio network node as an uplink subframe according to the obtained configuration information when the interference is to be measured, wherein the designated subframe is configured in the entirety or parts thereof;
receive, from the second radio network node in the designated subframe indicated by the configuration information, the reference signal; and
determine a value of the interference based on the reference signal.

16. The first radio network node according to claim 15, wherein the identifier for identifying the first radio network node comprises one or more of:
a cell identity;
Internet Protocol address;
Public Land Mobile Network identity;
measurement periodicity;
geographical information of the first radio network node and the second radio network node; and
downlink/uplink Time Division Duplex configuration.

17. The first radio network node according to claim 15, wherein the processing circuit is further configured to receive the configuration information from a network management unit.

18. The first radio network node according to claim 15, wherein the value of the interference is represented by one or more of:
a Channel Quality Indicator,
a Signal-to-Interference-and-Noise-Ratio,
a Signal-to-Interference-Ratio,
a Signal-to-Noise-Ratio,
a Reference Signal Received Power,
a Reference Signal Received Quality, and
a Received Signal Strength Indicator.

19. The first radio network node according to claim 15, wherein said flexible uplink and/or downlink subframe being adaptively configured as one of an uplink subframe and a downlink subframe as selected by the first or the second radio network node.

20. The first radio network node according to claim 19, wherein the processing circuit is further configured to configure the flexible uplink and/or downlink subframe as the uplink subframe indicated by the configuration information based on a need for measurement of the interference.

21. The first radio network node according to claim 15, wherein the processing circuit is further configured to adapt transmit power of the first radio network node based on the value.

22. The first radio network node according to claim 15, wherein the processing circuit is further configured to send the value of the interference to the second radio network node.

23. A second radio network node configured to enable a first radio network node to measure interference between the first radio network node and the second radio network node, the second radio network node comprising a processing circuit configured to:
obtain configuration information for configuring a designated subframe for transmission of a reference signal, the designated subframe being designated for enabling the first radio network node to measure the interference, wherein the designated subframe is a flexible uplink and/or downlink subframe, and wherein the configuration information indicates to the second radio network node that the designated subframe is to be configured as a downlink subframe;
configure the flexible uplink and/or downlink subframe as the downlink subframe indicated by the configuration information; and
send, in the designated subframe, the reference signal to the first radio network node.

24. The second radio network node according to claim 23, wherein the identifier for identifying the first radio network node comprises one or more of:
a cell identity;
Internet Protocol address;
Public Land Mobile Network identity;
measurement periodicity;
geographical information of the first radio network node and the second radio network node; and
downlink/uplink Time Division Duplex configuration.

25. The second radio network node according to claim 23, wherein the processing circuit is further configured to receive the configuration information from a network management unit.

26. The second radio network node according to claim 23, said flexible uplink and/or downlink subframe being adaptively configured as one of an uplink subframe and a downlink subframe as selected by the first or the second radio network node.

27. The second radio network node according to claim 23, wherein the processing circuit is further configured to receive a value of the interference; and adapt transmit power of the second radio network node based on the value.

28. The second radio network node according to claim 27, wherein the value of the interference is represented by one or more of:
a Channel Quality Indicator,
a Signal-to-Interference-and-Noise-Ratio,
a Signal-to-Interference-Ratio, a Signal-to-Noise-Ratio,
a Reference Signal Received Power,
a Reference Signal Received Quality, and
a Received Signal Strength Indicator.

29. The method of claim 1, wherein said obtaining comprises obtaining the configuration information without real-time, online coordination between the first and second radio network nodes.

30. The method of claim 1, wherein the designated subframe is predetermined according to the identifier and a time division duplex (TDD) configuration of the first radio network node.

31. The method of claim 1, wherein said dynamically configuring comprises determining whether the designated subframe in the first radio network node is to be configured as an uplink subframe or a downlink subframe, depending on whether interference is to be measured in the designated subframe.

32. The first radio network node of claim 15, wherein the processing circuit is configured to obtain the configuration information without real-time, online coordination between the first and second radio network nodes.

33. The first radio network node of claim 15, wherein the designated subframe is predetermined according to the identifier and a time division duplex (TDD) configuration of the first radio network node.

34. The first radio network node of claim 15, wherein the processing circuit is configured to dynamically configure the designated subframe as an uplink subframe by determining whether the designated subframe in the first radio network node is to be configured as an uplink subframe or a downlink subframe, depending on whether interference is to be measured in the designated subframe.

* * * * *

UNITED STATES PATENT AND TRADEMARK OFFICE
CERTIFICATE OF CORRECTION

PATENT NO.         : 9,584,272 B2
APPLICATION NO.    : 13/817665
DATED              : February 28, 2017
INVENTOR(S)        : Li et al.

It is certified that error appears in the above-identified patent and that said Letters Patent is hereby corrected as shown below:

On the Title Page

In Item (56), under "OTHER PUBLICATIONS", in Column 2, Line 2, delete "ESTI," and insert -- ETSI, --, therefor.

In the Specification

In Column 3, Line 15, delete "Cancellation" and insert -- Coordination --, therefor.

In Column 4, Line 1, delete "Local" and insert -- Local Area --, therefor.

In Column 4, Lines 31-32, delete "user equipment 131" and insert -- user equipment 140 --, therefor.

In Column 4, Lines 53-54, delete "user equipment 120," and insert -- user equipment 140, --, therefor.

In Column 4, Line 55, delete "user equipment 120," and insert -- user equipment 140, --, therefor.

In Column 6, Lines 11-12, delete "network management unit 150." and insert -- network management unit 160. --, therefor.

In Column 7, Line 56, delete "first radio network node 100" and insert -- first radio network node 110 --, therefor.

In Column 10, Line 51, delete "DL OFM" and insert -- DL OFDM --, therefor.

In Column 14, Line 45, delete "configuration," and insert -- configuration. --, therefor.

Signed and Sealed this
Eighteenth Day of July, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,584,272 B2

In Column 16, Line 65, delete "subframe" and insert -- subframe. --, therefor.

In the Claims

In Column 20, Line 64, in Claim 28, delete "a Signal-to-Noise-Ratio," and insert the same at Line 65 as a new subpoint.